United States Patent [19]

Takasaki et al.

[11] 3,811,016

[45] May 14, 1974

[54] LOW FREQUENCY CUT-OFF COMPENSATION SYSTEM FOR BASEBAND PULSE TRANSMISSION LINES

[75] Inventors: Yoshitaka Takasaki, Hachioji; Kouji Aoki, Tokyo, both of Japan

[73] Assignee: Hitachi, Ltd., Tokyo, Japan

[22] Filed: Nov. 1, 1972

[21] Appl. No.: 302,896

[52] U.S. Cl. .............. 179/170 R, 178/70 B, 330/31

[51] Int. Cl. .............................................. H04b 3/58

[58] Field of Search.................... 307/237; 328/162; 179/170 T, 170 C, 170 R; 178/70 B; 330/21, 31, 16, 19, 53

*Primary Examiner*—Kathleen H. Claffy

*Assistant Examiner*—Gerald Brigance

*Attorney, Agent, or Firm*—Craig and Antonelli

[57] ABSTRACT

A low frequency cut-off compensation system for reducing intersymbol interference due to low frequency cut-off in baseband hybrid pulse transmission systems including analog repeaters consists of amplifiers individually provided at the input end of respective analog repeaters.

Each of the amplifiers is a low frequency amplifier having such a characteristic as to effect compensation of the attenuation of an associated repeater section of the transmission line including a coaxial cable, an analog repeater and transformers and particularly effect overcompensation of the overall characteristic in the neighborhood of the cut-off frequency.

6 Claims, 11 Drawing Figures

LOW FREQUENCY CUT-OFF COMPENSATION SYSTEM FOR BASEBAND PULSE TRANSMISSION LINES

BACKGROUND OF THE INVENTION

1. Field of the Invention

This invention relates to low frequency cut-off compensation systems in pulse or digital transmission lines. More particularly, it concerns low frequency cut-off compensation systems for use in connection with so-called baseband pulse transmission where a pulse signal of a high pulse repetition frequency is directly transmitted without any modulation via a transmission line.

2. Description of the Prior Art

Where pulse signals are transmitted via a transmission line, many regenerative repeaters and/or analog repeaters are inserted in the transmission line for the purpose of compensating for the attenuation of the signal through the line. Especially, insertion of analog repeaters in the chain is desirable from an economical point of view; however, low frequency components of the signal transmitted through such an analog transmission line is subject to attenuation due to the presence of pulse transformers or the like provided on the input and output sides of the individual analog repeaters, and the accumulation of such attenuation through many analog repeater sections would lead to distortions of the pulse signal waveforms. For example, as a result of the accumulation of low frequency cut-off, a long and large undershoot is introduced into the pulse waveform. In such a case, the correct discrimination of the following pulses is difficult and the allowable number of analog repeaters in a chain is limited to four or five.

As a measure against this drawback, the so-called constrained bipolar system has heretofore been proposed. In this pulse coding system, consecutive pulses of alternately opposite polarities are transmitted. Even this coding system cannot counteract the pulse distortion due to the accumulation of low frequency cut-offs.

Also, it has been proposed to equalize the line characteristics for frequencies below a particular low frequency in order to realize means for reducing or alleviating adverse effects due to low frequency cut-off with a simple circuit construction. With such system, however, if the intersymbol interference is to be held within five per cent with thirty analog repeaters, for instance, the gain of the equalizing amplifier should be 30 decibels or more. Moreover, degradation by the transformer characteristic variation is comparatively large in the system. Generally, the gain of the equalizing amplifier and the degradation due to element variation (sensitivity) are desired to be low, and this system is undesired from this standpoint.

SUMMARY OF THE INVENTION

The primary object of the invention, accordingly, is to provide a low frequency cut-off compensation system to be used where pulse signals are transmitted in baseband.

Another object of the invention is to realize the above low frequency cut-off compensation system with a simple circuit construction.

A further object of the invention is to realize the equalizing amplifier for the low frequency cut-off compensation with an amplifier of a comparatively low gain and low sensitivity.

To achieve the above objects, in accordance with the invention in each unit repeater section in a high frequency pulse signal transmission line including many analog repeaters, a compensation circuit for overcompensating the characteristics of the section for a certain low frequency region is provided.

BRIEF DESCRIPTION OF THE DRAWINGS

The above and other objects, features and advantages of the invention will become more apparent from the following description having reference to the accompanying drawings, in which.

DESCRIPTION OF THE PREFERRED EMBODIMENT

Figure 1:
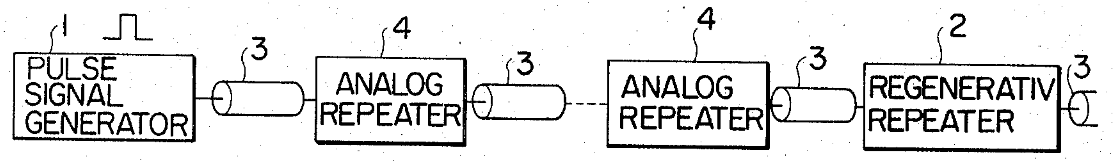
FIG. 1 is a schematic view outlining a baseband hybrid digital transmission line.

FIG. 1 shows a pulse signal transmission line having many analog repeaters embodying the invention. Referring to the figure, reference numeral 1 designates a pulse signal generator, which may correspond to the transmission end of a transmitting station or a regenerative repeater. Numeral 2 designates another regenerative repeater, which may constitute the receiving end of a receiving station. The generator 1 and repeater 2 are connected through a transmission line consisting of, for instance, coaxial cables 3. Numeral 4 designates analog repeaters to compensate for attenuation of the transmitted signal. They are inserted in the transmission line at a constant interval. Although not shown, each analog repeater 4 is provided with two transformers at its input and output ends, respectively.

Figure 2:
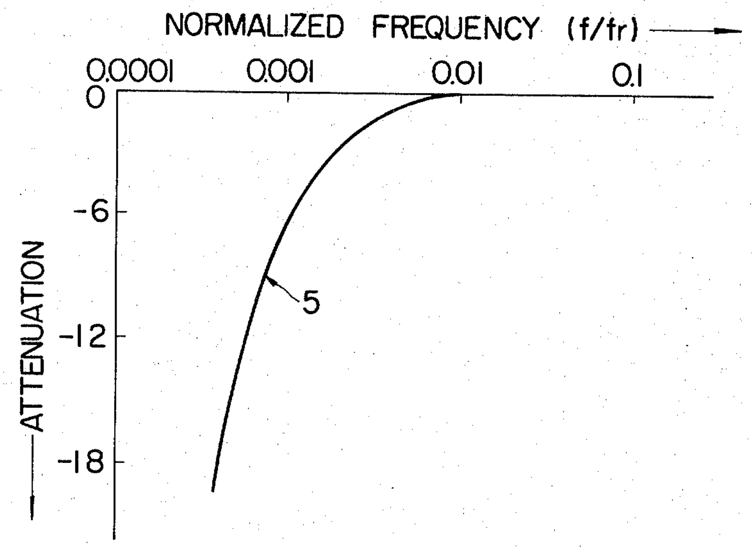
FIG. 2 is a graph showing a frequency characteristic of the above transmission line for a low frequency region.

FIG. 2 shows a transmission characteristic of a unit repeater section, that is, a low frequency transmission characteristic of unit transmission line section including a repeater and two transformers adjacent the input and output ends thereof. In the figure the ordinate is taken for attenuation (in decibels), and the abscissa for normalized frequency $f/f_r$ (where $f_r$ is the pulse repetition frequency). The loss l here is related to the frequency $f$ as $$l = 1/(1 + f_L/jf)^2 \qquad (1)$$

where $f_L$ is the lower cut-off frequency, and $j$ is the imaginary unit. The curve of FIG. 2 is given as a practical example where $f_L/f_r$ (normalized low cut-off frequency) is 0.001.

If a pulse signal is transmitted directly through the transmission line having the above characteristic, it would be subject to waveform distortions due to the low frequency cut-off. Such waveform distortions could be overcome by using amplifiers capable of compensating the characteristic of FIG. 2; however, the amplifier gain cannot go to infinity at zero frequency from the practical point of view.

Figure 3:
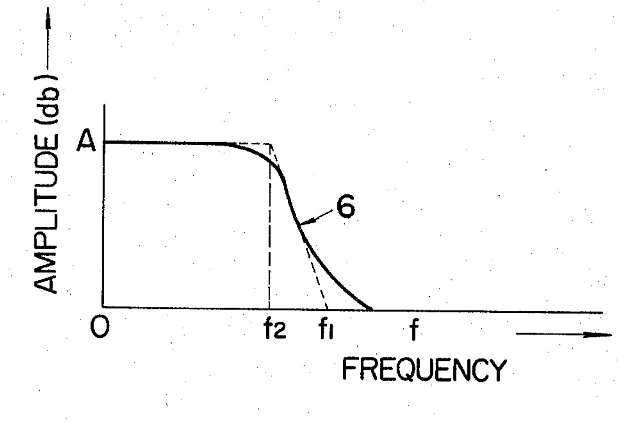
FIG. 3 is a graph showing a frequency characteristic of a low frequency cut-off compensation amplifier.

FIG. 3 shows a characteristic of an amplifier. While the gain of this amplifier is zero at high frequencies, it begins to increase with decrease in frequency, for instance, from a frequency around $f_1$, and has a constant value for frequencies lower than a certain frequency, for instance, around $f_2$. The gain G here is given as $$G = [A\ (1 + fj/f_1)/(1 + jf/f_2)]^2 \quad (2)$$

where A is the amplification degree at zero frequency. With such a characteristic amplifier it is possible to obtain equalization down to a fairly low frequency.

Figure 4:
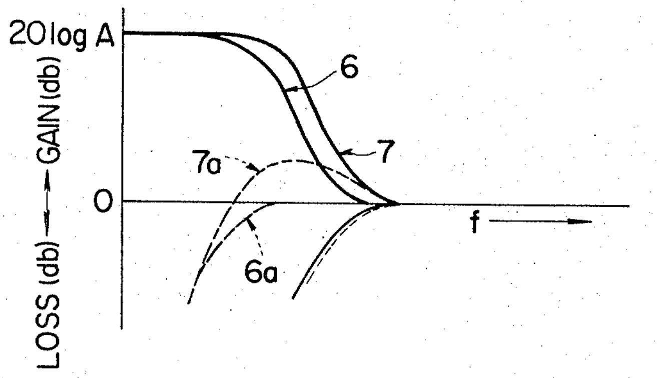
FIG. 4 is a graph illustrating the principles of the low frequency compensation underlying the invention.

Heretofore, it has been suggested to use amplifiers such as the one having a characteristic according to curve 1 shown in FIG. 4 for compensating for the loss as shown in FIG. 2. In this case, the frequency $f_1$ in the above equation is made equal to the low cut-off frequency $f_L$. By so doing, it is possible to obtain a substantially flat overall characteristic above a certain frequency, as shown by curve 6a in FIG. 4.

The inventors, however, have found that it is possible to reduce the intersymbol interference in the pulse transmission with amplifiers of low amplification degrees and where $f_1 > f_L$. This is achieved through overcompensation for a frequency region in the neighborhood of the cut-off frequency such as to increase the overall characteristic amplification degree, as shown by curve 7a in FIG. 4.

Figure 5:
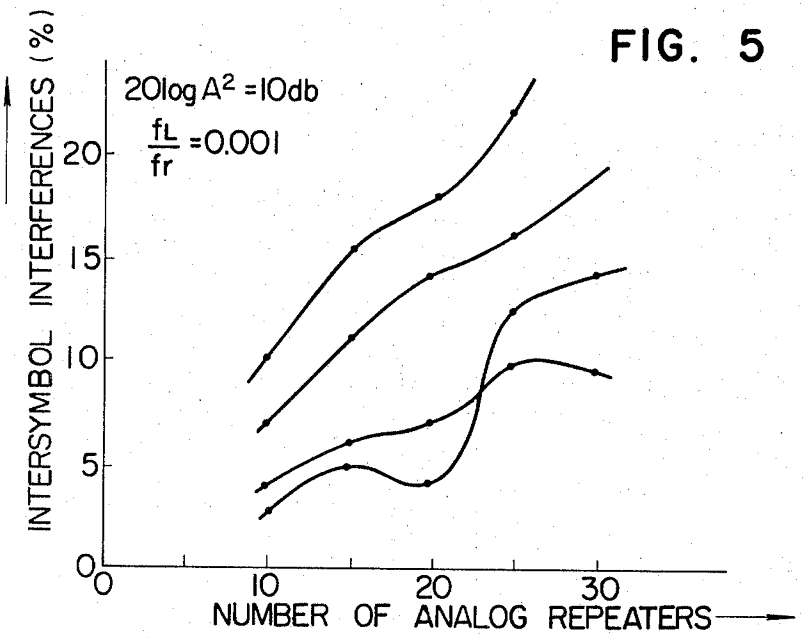
FIGS. 5, 6, and 7 are graphs showing the relations between the intersymbol interference and the number of analog repeaters with $f_1/f_L$ used as the third parameter.
Figure 6:
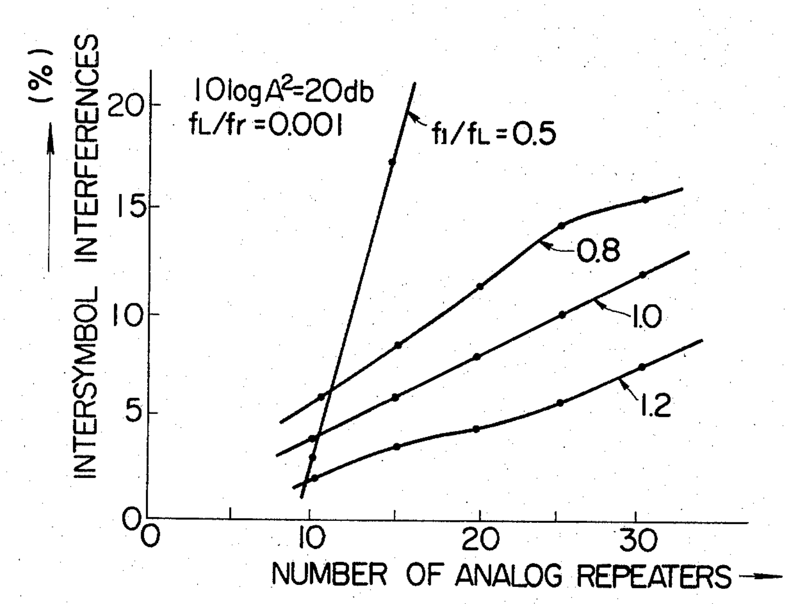
Figure 7:
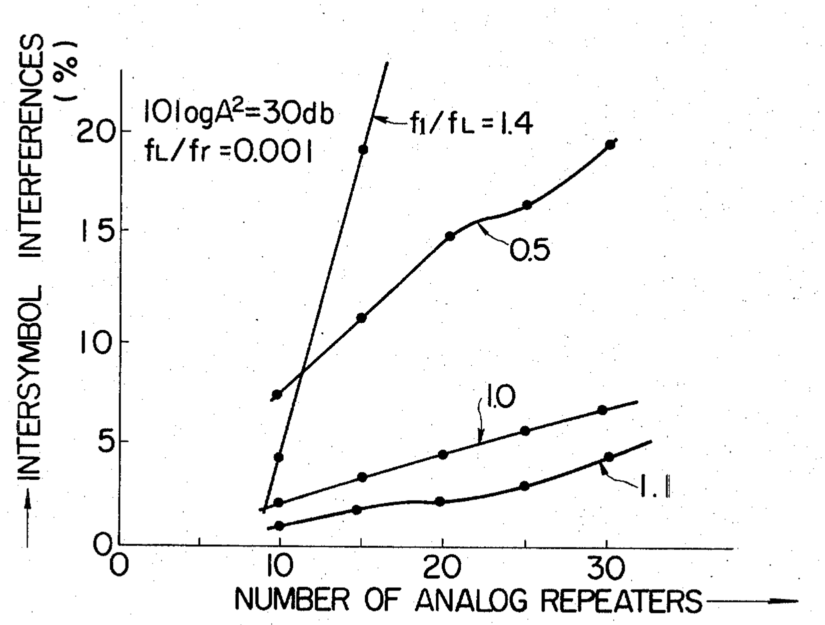

FIGS. 5, 6, and 7 show the relations between the intersymbol interference and the number of analog repeaters with $f_1/f_L$ used as the third parameter and with respective amplification degrees of 10db, 20db and 30db.

It will be seen from the figures that the intersymbol interference is low for $f_1/f_L$ of larger than 1.0. Particularly, pronounced effects are obtained when the amplification degree of the amplifier is low (FIG. 5). It is to be noted that the same effects that would have conventionally been obtained with an amplification degree of 30db can be obtained with an amplification degree of only 20db and with improved sensitivity. This is attributable to the fact that phase compensation is concurrently obtained with overcompensation of the amplification degree for the low frequency region.

Figure 8:
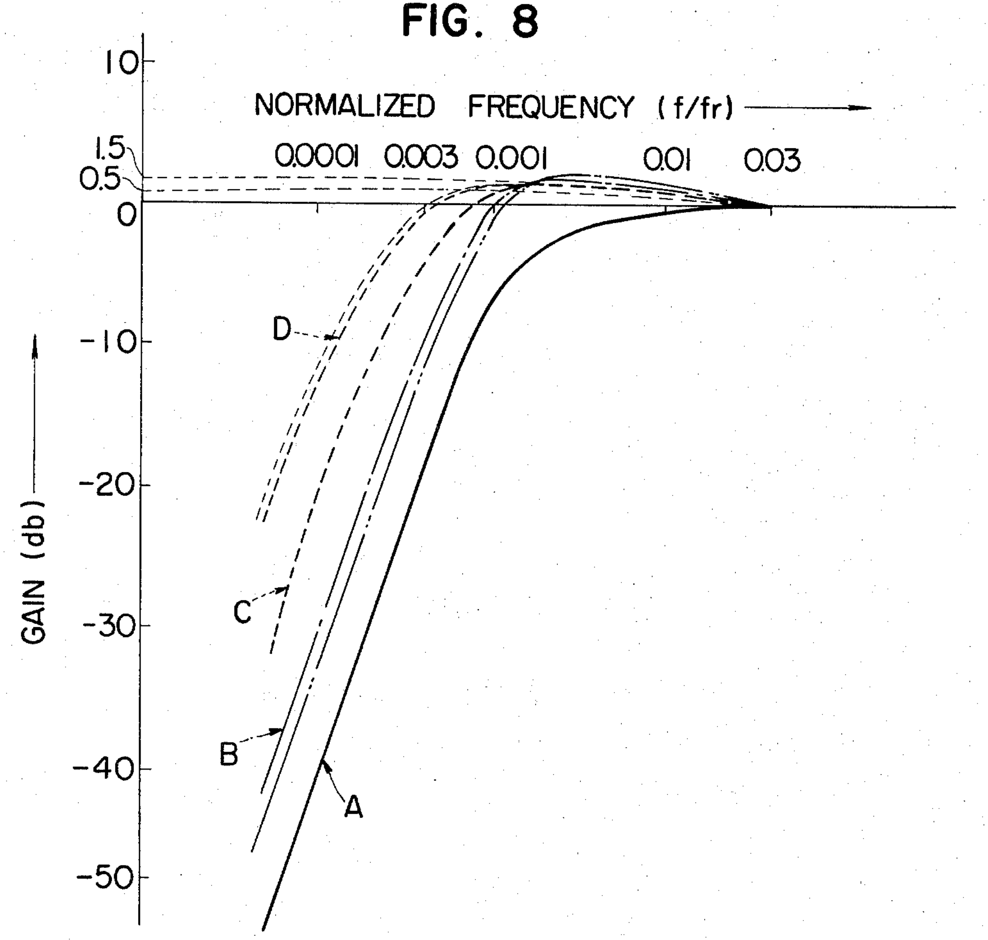
FIG. 8 is a graph showing low frequency cut-off compensation characteristics obtained according to the invention.

FIG. 8 shows the overall characteristics obtained on the basis of the above results with minimum intersymbol interference. In the figure curve A represents a characteristic like that of FIG. 2, that is, a characteristic of a unit repeater section using two transformers. In case of FIG. 5, a most suitable relation is obtained with $f_1/f_L = 1.8$, and an overall characteristic obtained therewith is represented by curve B in FIG. 8. In cases of FIGS. 6 and 7, a most suitable relation is obtained with $f_1/f_L$ respectively set to 1.2 and 1.1, and overall characteristics obtained therewith are represented by respective curves C and D in FIG. 8. Generally, the relation between $f_1/f_L$ and A is represented as $$f_1/f_L = A/A-1$$

It will be appreciated from FIG. 8 that far superior results can be obtained through overcompensation of 0.5 to 1.5db for a frequency region ranging from 1/3,000 to 1/30 of the pulse repetition frequency compared to a characteristic obtained through a mere flat compensation with $f_1/f_L$ set to unity.

The above-described overcompensation is applied with a unit repeater section, that is a circuit having a single analog repeater, and with 30 repeater sections, for instance, over- compensation at levels ranging between 0.5 and 45db may be obtained. Usually, one section of a transmission line consists of 10 to 30 unit repeater sections, so that a one section optimum state may be obtained with overcompensation between 0.5 and 45db. Also, as is apparent from FIGS. 5 to 7, overcompensation above this range would rather lead to deteriorated characteristics, so overcompensation within this range is most suited.

In accordance with the present invention, a reduction of the intersymbol interference and a reduction of the amplifier gain and sensitivity required therefor may be obtained with the same number of analog repeaters in one transmission line section by effecting overcompensation for a low frequency region on the basis of the above results.

Figure 9:
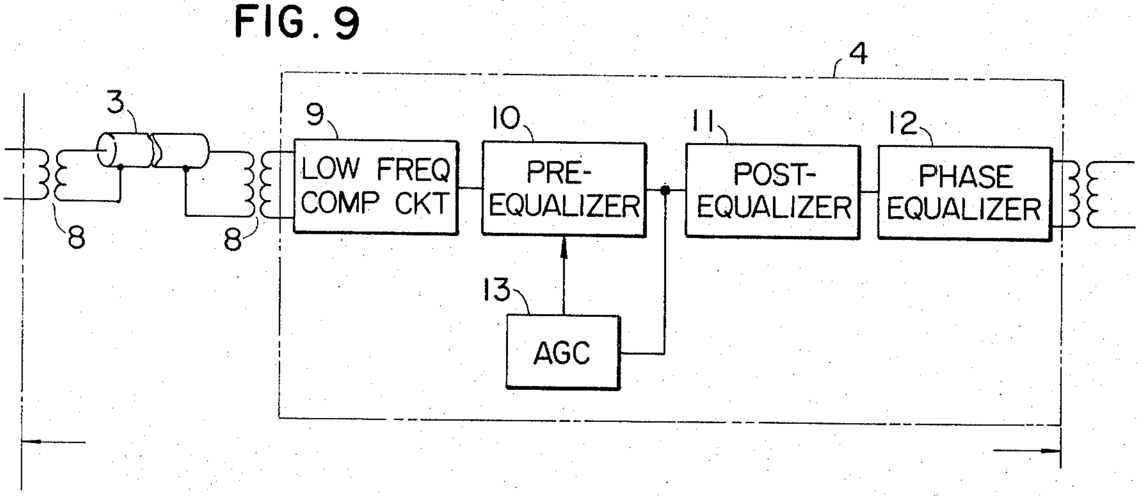
FIG. 9 is a schematic representation of an embodiment of unit repeater section in a baseband pulse transmission line according to the invention.

FIG. 9 shows the construction of a unit repeater section in a pulse signal transmission line embodying the invention. Similar to FIG. 1, numerals 3 and 4 respectively designate a transmission line cable and an analog repeater. In addition to these parts, the unit repeater section also includes two transformers 8. The analog repeater comprises a low frequency compensation amplifier circuit 9, which constitutes the gist of the invention, a preamplifier 10, an automatic gain control circuit (AGC) 13 controlling the amplification degree of the preamplifier 10 according to the output thereof, a post-equalizer 11 (an amplifier having a sharp high frequency cut-off characteristic), and a phase equalizer 12 to compensate for phase deviations due to the post-equalizer 10 or post-equalizer 11.

While the low frequency compensation circuit according to the invention is provided as the input end of the analog repeater of the above construction, it may, in some cases, be provided within the preequalizer.

Figure 10:
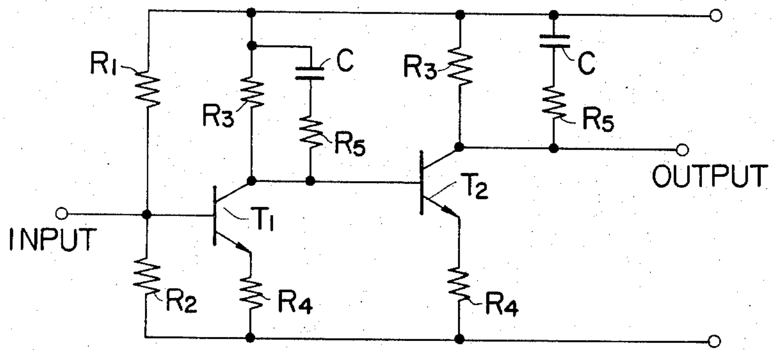
FIGS. 10 and 11 are circuit diagrams showing examples of the circuit construction of the low frequency compensation circuit in the embodiment of FIG. 9.
Figure 11:
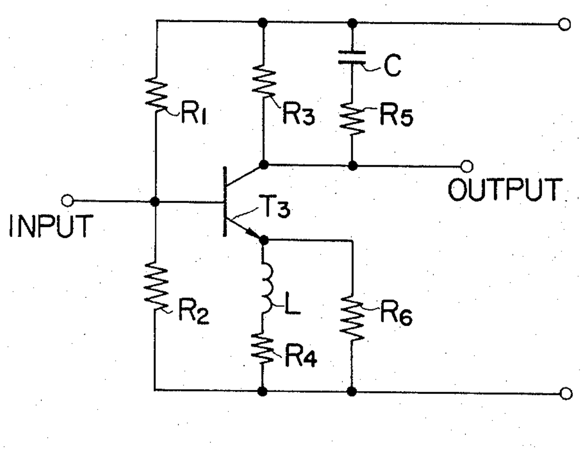

FIGS. 10 and 11 show examples of the construction of the low frequency compensation amplifier circuit 9 according to the invention.

The circuit of FIG. 10 consists of two amplifier stages including transistor $T_1$ and $T_2$, the stages individually having the same constants for the corresponding parts. Each stage has a gain characteristic given as $$G = \frac{R_3}{R_4} \cdot \frac{1 + j2\pi f \cdot R_5 \cdot C}{1 + j2\pi f(R_3 + R_5)C} \quad (3)$$

This equation is obtained by substituting $A = R_3/R_4$ $1/f_1 = 2\pi\ R_5 \cdot C$ and $1/f_2 = 2\pi\ (R_3 + R_5)C$ into equation 2.

The circuit of FIG. 11 has one stage and may be employed where large gain is not required. In this case, the intended end may be achieved by setting $1/f_1 = 2\pi L/R_5$ and $1/f_2 = 2\pi L/(R_4 + R_5)$ While the above low frequency compensation circuits embodying the invention makes it possible to obtain the intended results through effective compensation, the invention is by no means limited to these circuits, but any other suitable circuit may be used to improve characteristics of baseband pulse transmission systems through appropriate overcompensation for a low frequency region in accordance with the invention.

As has been described in the foregoing, according to the invention it is possible to reduce or mitigate such adverse effects as waveform distortions of pulse signals transmitted through transmission lines that would result from accumulative low frequency component attenuation through many analog repeaters in the transmission line by adding to each analog repeater a simple compensating circuit so as to achieve overcompensation of line characteristics for a certain low frequency region instead of the usual flat compensation, which is very useful in obtaining improvements of pulse transmission system characteristics.

What is claimed is:

1. In a baseband pulse transmission system including a plurality of analog repeaters successively inserted one after another in a cable transmission line through transformers individually connecting the respective analog repeaters to respective cable sections, a low frequency cut-off compensation system comprising low frequency compensation amplifiers individually provided at the input end of said respective analog repeaters, each said low frequency compensation amplifier having a frequency characteristic effecting overcompensation of a composite frequency characteristic resulting from the attenuation characteristic of an associated repeater section of the transmission line including an analog repeater and associated transformers for a frequency region in the neighborhood of the cut-off frequency of said attenuation characteristic of said associated repeater section.

2. The low frequency cut-off compensation system according to claim 1, wherein the overcompensation is provided for frequencies ranging between 1/3,000 and 1/30 of the pulse repetition frequency of the transmitted signal and at levels ranging between 0.5 and 1.5 decibels.

3. The low frequency cut-off compensation means according to claim 1, wherein each said low frequency compensation amplifier has a frequency characteristic wherein its amplification factor A has a constant value for frequencies below a frequency $f_2$, gradually reduces with increase in frequency from $f_2$ to another frequency $f_1$ and tends to zero for frequencies above $f_1$, said frequency $f_1$ being higher than the cut-off frequency $f_L$ of the attenuation characteristic of said repeater section.

4. The low frequency cut-off compensation system according to claim 3, wherein the gain of each said low frequency compensation amplifier at frequence f is given as $$\left\{ A \frac{1 + j\dfrac{f}{f_1}}{1 + j\dfrac{f}{f_2}} \right\}^2$$

with $f_1 = f_L A/A - 1$.

5. The low frequency cut-off compensation system according to claim 1, wherein each said low frequency compensation amplifier comprises two cascade amplifier stages, which are constituted by power supply pair terminals, first and second resistors connected in series between said power supply pair terminals, a first transistor having the base thereof connected to an input terminal and to the junction between said first and second resistors, the collector thereof connected through a third resistor to one of said power supply pair terminals and the emitter thereof connected through a fourth resistor to the other power supply terminal, a first series circuit consisting of a capacitor and a fifth resistor, said first series circuit being connected parallel with said third resistor, a second transistor having the base thereof connected to the collector of said first transistor, the collector thereof connected through a resistor similar to said third resistor to said one of the power supply pair terminals and the emitter thereof connected through a resistor similar to said fourth resistor to said other power supply terminal, and a second series circuit similar to said first series circuit and in parallel with said resistor similar to said third resistor.

6. The low frequency cut-off compensation system according to claim 1, wherein each said low frequency compensation amplifier comprises power supply pair terminals, first and second resistors connected in series between said power supply pair terminals, a transistor connected to an input terminal and to the junction between said first and second resistors, the collector thereof connected through a third resistor to one of said power supply pair terminals and the emitter thereof connected through an inductor and a fourth resistor to the other power supply terminal, a series circuit of a capacitor and a fifth resistor, said series circuit being connected parallel with said third resistor, and a sixth resistor connected parallel with the series circuit of said inductor and said fourth resistor.

* * * * *